United States Patent [19]

Uhlig

[11] 4,057,609
[45] Nov. 8, 1977

[54] METHOD OF MAKING BLOWN PLASTIC ARTICLES

[75] Inventor: Albert R. Uhlig, Toledo, Ohio

[73] Assignee: Owens-Illinois, Inc., Toledo, Ohio

[21] Appl. No.: 651,673

[22] Filed: Jan. 23, 1976

Related U.S. Application Data

[63] Continuation of Ser. No. 500,679, Aug. 26, 1974, abandoned.

[51] Int. Cl.² ............................................. B29C 17/07
[52] U.S. Cl. ........................................ 264/89; 264/97; 264/328; 425/533
[58] Field of Search ..................... 264/89, 94, 97, 328, 264/329; 425/242 B, 245, 252, 324 B, DIG. 209, DIG. 214

[56] References Cited

U.S. PATENT DOCUMENTS

| | | | |
|---|---|---|---|
| 2,262,612 | 11/1941 | Kopitke | 264/97 |
| 3,590,114 | 6/1971 | Uhlig | 264/328 |

FOREIGN PATENT DOCUMENTS

1,047,183  11/1966  United Kingdom ...... 425/DIG. 209

Primary Examiner—Jan H. Silbaugh
Attorney, Agent, or Firm—Richard D. Heberling

[57] ABSTRACT

The present invention proposes a novel method of making a blown plastic article. A cantilevered blow pin is axially insertable into and removable from a parison mold cavity. When inserted into the cavity, the blow pin abuts a support which is coaxial with the blow pin and which supports the blow pin against deflection in the cavity. Upon filling of the parison mold cavity with plasticized plastic material under pressure, a parison is formed about the blow pin and the support. Upon removal of the blow pin from the cavity, the parison thereon is stripped from the cavity and from the support. That portion of the parison projecting beyond the blow pin and formerly enclosing the support forms a tubular extension projecting beyond the blow pin. Upon transfer to a blow mold, the projecting portion of the parison is pinched shut to form a blowable shape, which is then blown interiorily of a blow mold into either a blown pre-form or the final article.

8 Claims, 19 Drawing Figures

METHOD OF MAKING BLOWN PLASTIC ARTICLES

This is a continuation of application Ser. No. 500,679, filed Aug. 26, 1974, now abandoned.

BACKGROUND OF THE INVENTION

In the art of blow molding plastic articles, particularly plastic containers, the initial shape or "parison" which is subsequently blown is generally formed either by injection molding or by free extrusion. Difficulties have been encountered in forming parisons by either one of these two generally accepted methods.

The formation of a parison by free extrusion is limited by the necessity of forming a tubular shape, and it is impossible to initially form a finish, neck or the like on this tube. Further, freely extruded parisons thermally sag as they dangle from the extrusion orifice, a thermal gradient across the axial length of the parison is inherent due to the exposure of the first-extruded portions to the ambient atmosphere while the later-extruded portions are being formed, and abrupt transitions in wall thickness, etc. are difficult to make during continuous extrusion operations.

Injection molded parisons, on the other hand, also have some drawbacks. Typically, a core pin is cantilevered into a surrounding parison mold and the sides and free end of this core pin are encases in plastic to form a blowable shape having a closed bottom. It is difficult to maintain absolute concentricity of the blow pin in the parison mold, resulting in a shape which is not uniformly inflatable during subsequent blowing, snce the cantilevered core pin cannot be supported against radial deflection while still forming the blowable shape having a closed end.

Each system of parison formation has its own advocates, but if it were possible to support the free end of a cantilevered core pin during the injection molding of a parison, particularly for large one-half gallon or gallon containers or the like, the overall advantages of the injection molding system would probably lead to its almost universal adoption.

BRIEF DESCRIPTION OF THE PRESENT INVENTION

In essence, the present invention proposes the injection molding of a tubular parison which is subsequently pinched shut and blown. The term "injection molding" includes not only conventional injection molding but also displacement molding as taught in the issued patent of Albert R. Uhlig U.S. Pat. No 3,590,114, assigned to the Assignee of the present invention.

Generally, the present invention proposes the assembly of an injection mold including an open ended parison mold surrounding an interior parison cavity and an axially elongated core pin telescopically inserted into the parison mold cavity. This pin is somewhat shorter than the axial extent of the parison mold cavity. Located in the parison mold cavity at the end opposite that through which the core pin is inserted is a support against which the core pin is bottomed when the parison mold is completely assembled. This support may serve other functions, i.e. it may be a portion of a displacement molding elements, it may perform a valving function, or the like, but the primary function of the support is to locate the core pin in the parison mold cavity and to secure the core pin against radial deflection during the injection molding operation.

Preferably, the parison molding operation is carried out by the introduction of plasticized material under pressure through an annular orifice concentric with the support.

Following the filling of the cavity with plasticized material under pressure, the core pin is retracted from the cavity carrying the molded parison with it. Since a portion of the parison has been formed about the support, the parison is longer than the core pin and projects beyond the free end of the core pin. This projecting portion of the parison is that which is pinched shut during a subsequent blow molding operation to form the final blowable shape.

Thus, it can be seen that the present invention provides a means for injection molding a parison to avoid the disdvantages of parison formation by extrusion, while at the same time eliminating the disadvantages of normal injection molded parison formation.

It is, therefore, important object of the present invention to provide a method of making a blown plastic article wherein a parison is injection molded as an open ended tube supported on a core pin and projecting there beyond to provide for the support of the core pin during the injection molding operation.

Another important object of this invention is the provision of a method of injection molding a parison for a blown article by assembling a cantilevered core pin in a surrounding parison mold and supporting the free end of the core pin while injection molding a parison about the core pin.

It is a further, and no less important, object of the present invention to provide a method of making a blown plastic article from a parison which has been injection molded in a mold assembly including an elongated cantilevered core pin projecting through one open end of a parison mold into contact with a support located interiorly of the parison mold adjacent the other open end thereof, injection molding a parison about both the core pin and support, and stripping the core pin and the parison mold and the support to provide a parison having a pinchable portion projecting beyond the free end of the core pin.

Other further objects of the present invention will become apparent from the following detailed description of the invention and the appended claims.

ON THE DRAWINGS

FIG. 16 is a view similar to FIG. 15 showing the blowing of the pre-from;

AS SHOWN ON THE DRAWINGS

Figure 1:
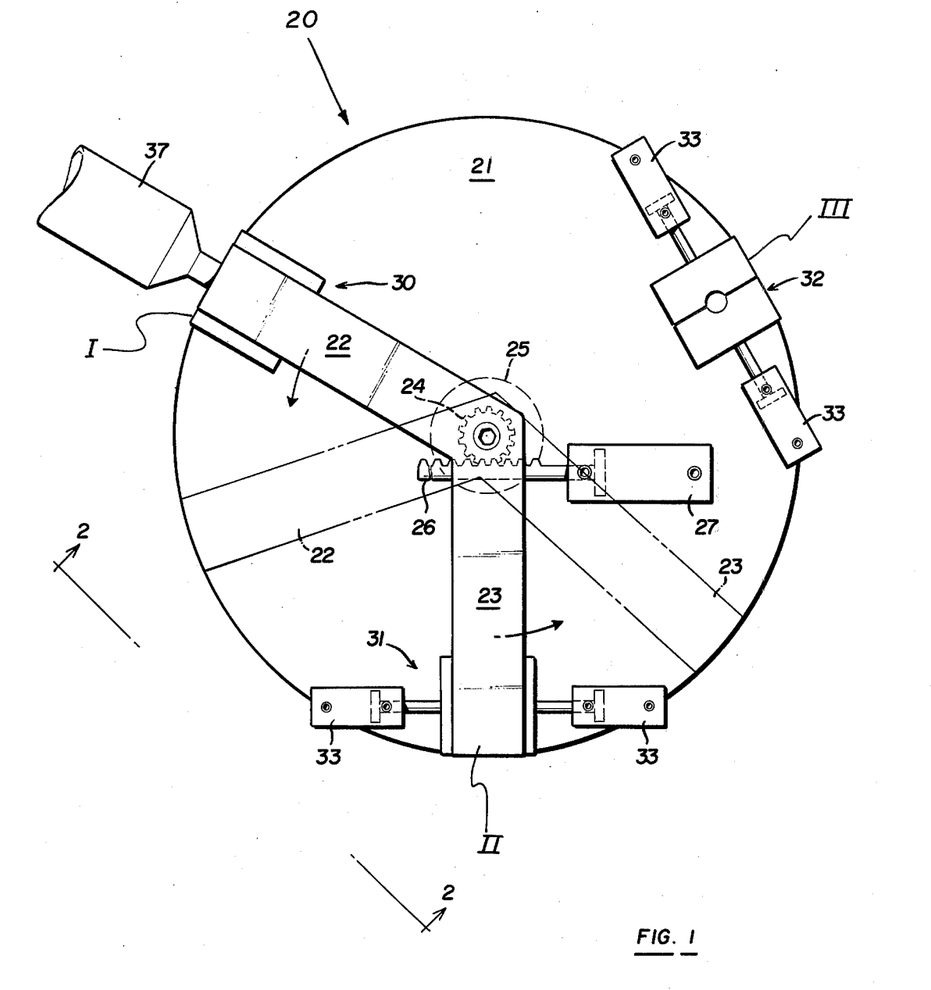
FIG. 1 is a plan view presenting a schematic representation of an apparatus of the present invention capable of carrying out the method of the present invention.

In FIG. 1, reference numeral 20 refers generally to an apparatus of the present invention capable of carrying out the method of the present invention. From FIGS. 1 and 2, it will be seen that the apparatus 20 includes a fixed table 21 upon which is located three operating stations traversed by a pair of carrying arms 22, 23 mounted on a central, upstanding post 24. The post 24 forms the piston rod of a raising and lowering cylinder 25 located beneath the table 21. The post 24 is axially splined for cooperation with a rack 26 which is reciprocated by a hydraulic cylinder 27 having its actuating piston secured to the rack. Upon reciprocation of the rack 26, the post is oscilatable through 120° to move the arms 22, 23 over the three operating stations located on the table 21 and indicated by reference numerals I, II and III. It will be apparent that retraction to the right of the rack 26 swings the arm 22 from its illustrative position, wherein it registers with station I to the second position at which the arm 22 overlies station II. At the same time, the arm 23 is swung from registration with the station II to registration with station III.

Figure 2:
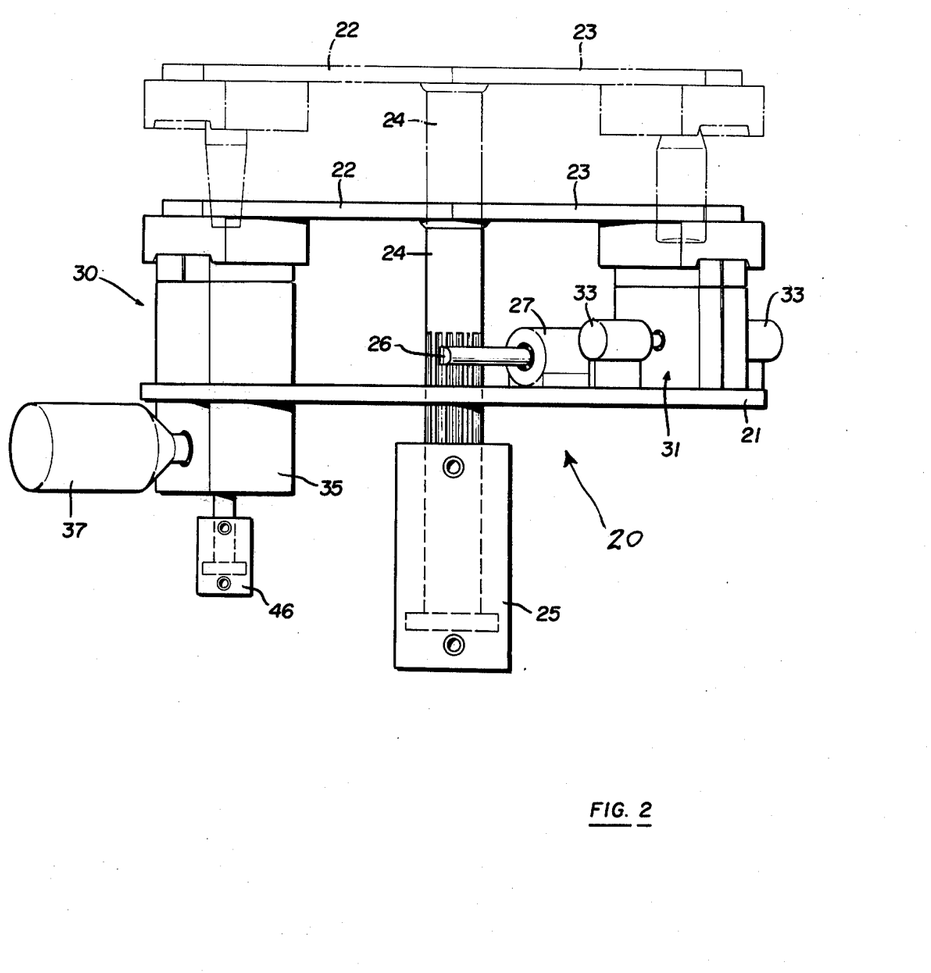
FIG. 2 is a side elevational view taken along the plane 2—2 of FIG. 1.
Figures 3, 4:
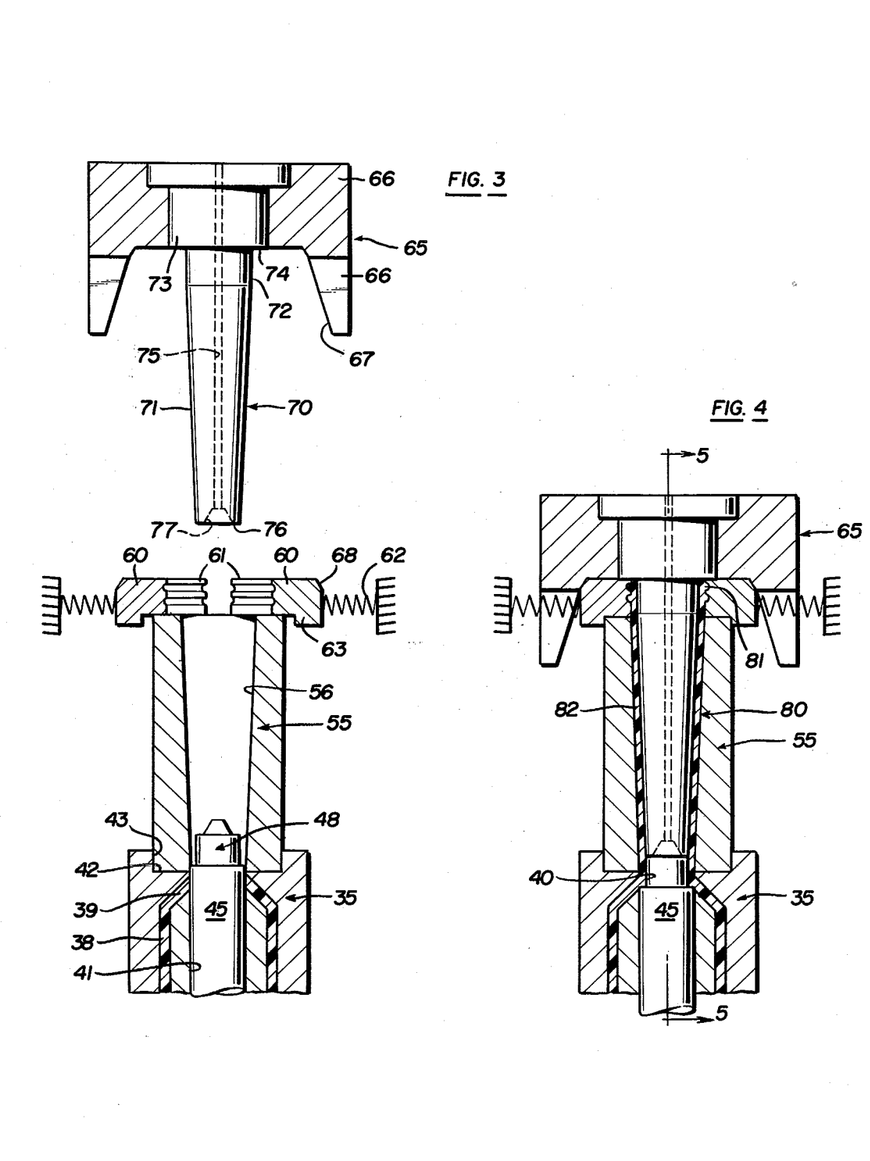
FIG. 3 is fragmentary sectional view illustrating the core pin, parison mold, and core support elements prior to assembly.
FIG. 4 is a view similar to FIG. 3 showing the parts in assembly during parison formation.

In the schematic diagrams of FIGS. 2 and 3, it will be seen that a fixed parison station, indicated generally at 30, is located at station I, a pair of openable and closable preform blow molds, indicated generally at 31, are located at station II and a pair of final blow mold sections 32 are located at station III, the preform blow molds 31 and the final blow molds 32 being openable and closable by fluid pressure actuated cylinders, indicated generally at 33. It is, of course, appreciated that the machine illustrated in FIGS. 1 and 2 is shown schematically. In the remainder of the schematic drawings of FIGS. 3 through 19, various details schematically illustrated in FIG. 1 are eliminated and only the components necessary to carrying out the practice of the present invention are illustrated. Thus, in FIGS. 3–19, the table, the arms 22, 23, the actuating cylinders 33, and other details are deleted.

THE SPECIFIC EMBODIMENT OF FIGS. 3–13

Figure 11:
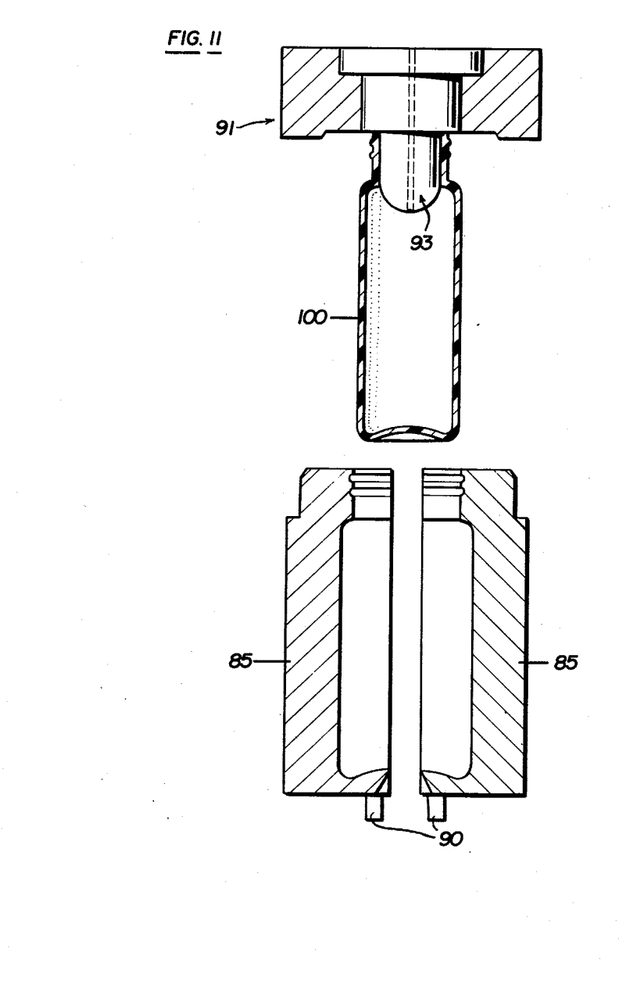
FIG. 11 is a view similar to FIG. 10 showing the stripping of the blown pre-form from the pre-form blow mold.
Figure 12:
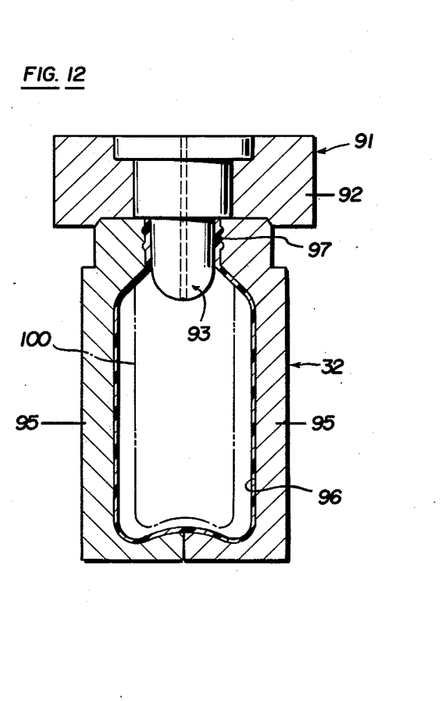
FIG. 12 is a view showing the blowing of the pre-form to a final configuration.
Figure 13:
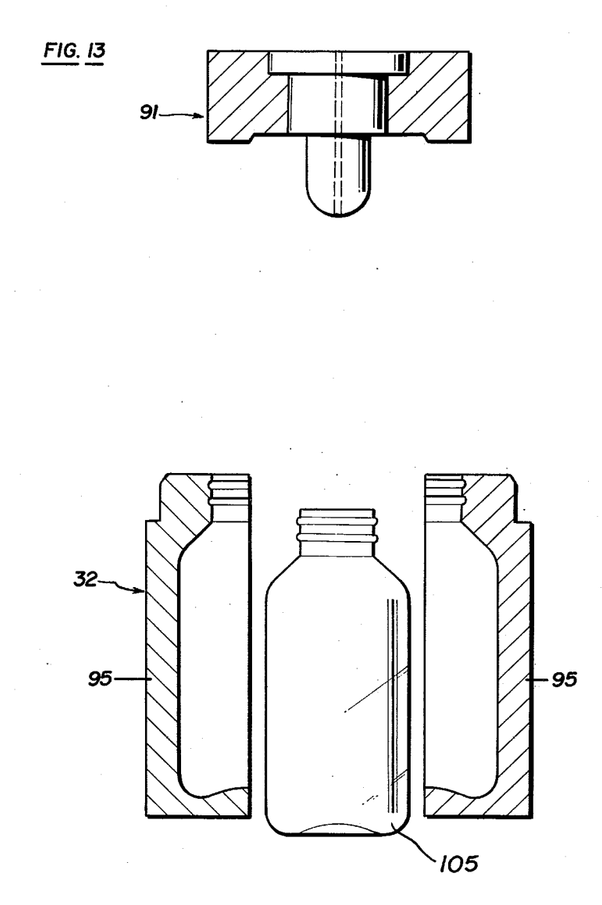
FIG. 13 is a view similar to FIG. 12 showing the ejection of the final blown shape.

First, it will be understood that the operations schematically illustrated in FIGS. 3–6 are carried out at station I; the operations of FIGS. 7–11 are carried out at station II, and the operations of FIGS. 12 and 13 are carried out at station III.

Figure 5:
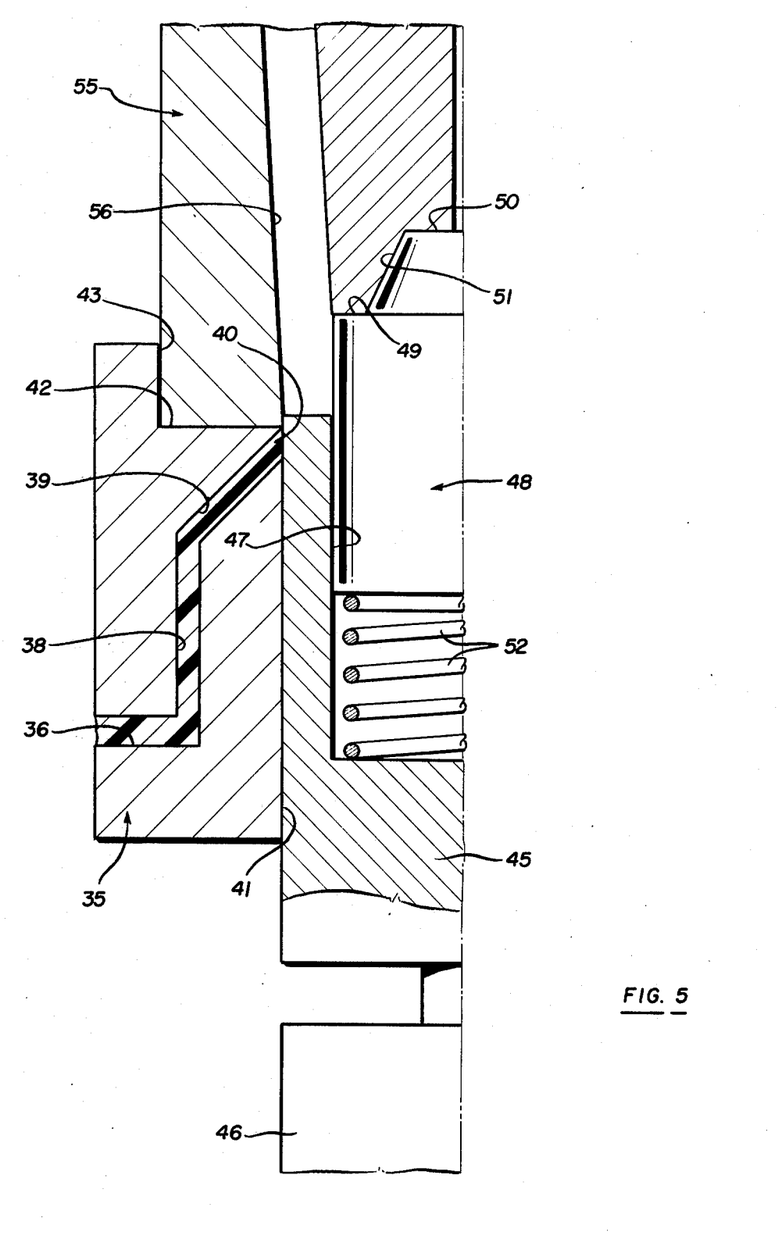
FIG. 5 is an enlarged fragmentary sectional view taken along the plane 5—5 of FIG. 4.

More specifically, as illustrated in FIG. 5, an orifice block 35 is located at station I, this block being carried by the table 21. The orifice block has a laterally opening passage 36 communicating with an extruder or injection molding machine 37 (indicated schematically in FIGS. 1 and 2) supplying plastic material under pressure to the passage 36. Passage 36 communictes with an annular distribution passage 38 formed interiorly of the block 35 and merging into a orifice passage 39 which is generally conical. This orifice passage 39 terminates in an annular outlet orifice 40 opening onto a cylindrical bore 41 extending vertically through the block 35. Immediately adjacent the orifice and counter-sunk into the upper surface of the orifice block 35 is a recess concentric with the bore 41 and defining a horizontal support surface 42 and an annular vertical shoulder 43.

Slideable in the bore 41 is a sleeve valve 45 actuated for axial movement in the bore 41 by a sleeve valve cylinder 46. This sleeve valve 45 opens and closes the orifice 40 to thereby control the flow of plastizied material under pressure through the injection channel 36, 38, 39 and the orifice 40. The sleeve valve 45 has an open topped, axial recess 47 which slideably receives a guide pin 48. This guide pin 48 is cylindrical, and the upper end of the guide pin projects axially beyond the upper extremity of the sleeve valve 45. The upper free end of the guide pin 48 is provided with an annular horizontal support ledge 49 and a free horizontal upper end 50 joined to the ledge 49 to a conical joining surface 51.

The guide pin 48 is urged upwardly in the recess 49 of the sleeve valve 45 by a compression spring 52 bottomed in the valve recess 47. The guide pin 48 is moveable downwardly relative to the orifice block 35 and relative to the sleeve valve 45 against the compression of the spring 52.

Positioned at station I and forming a part of the parison mold station 30 is a fixed, generally cylindrical parison mold 55, the parison mold 55 being bottomed on the orifice block ledge 42 and peripherally confined by the shoulder 43. The parison mold 55 has a conical, upwardly and outwardly tapering inner wall 56 communicating fully with the orifice block bore 41. Superimposed on the cylindrical parison mold 55 are a pair of finish mold sections 60, each said section being generally semi-annular in shape. The two sections cooperably define a finish configuration at their inner peripheries 61. The finish mold blocks 60 are normally urged outwardly to the positions illustrated in FIGS. 3 by tension springs 62. Each block carries a stop shoulder 63 limiting movement of the blocks toward one another and toward the axis of the parison mold bore 56. The relationship between the parison mold bore 56 and the finish mold block interior surfaces 61 is such that the blocks, when closed, define a cylindrical finish mold opening which fully communicates with the bore 56.

Carried by the arm 22 for vertical movement therewith is a core pin assembly best illustrated in FIG. 3 and indicated generally by reference numeral 65. This core pin assembly 65 comprises an upper block 66 secured to the arm 22 (by means not shown) and having downwardly projecting cam fingers 66 defining interior cam surfaces which are engagable with corresponding cam surfaces 68 formed on the finished mold blocks 60 at the upper and outer edges thereof. Secured to the block 66 is a core pin 70 having a conical outer surface 71 of a taper matching the taper of the conical parison mold bore 56, the conical surface 71 merging into an upper cylindrical surface 72 of the same axial dimension as the neck mold blocks 60. An enlarged cylindrical embossment 73 overlying the conical surface 72 defines a stop shoulder 74 co-planar with the lower surface of the block 66. An interior, axial bore 75 extends throughout the entire vertical length of the pin 70 for communication with a source of air under pressure (not shown). The lower free end 76 of the pin 70 is provided with an interior recess 77 of a size and taper to receive the conical surface 51 of the guide pin 48 heretofore described.

Describing now the operation of the apparatus and particularly the operations performed at station I, the machine is initially positioned as illustrated in FIG. 1 of the drawing, i.e. with the arm 22 registering with the parison mold station I and with the arm 23 registering with the pre-form mold station II. Further, the raise and lower cylinder 25 is actuated to elevate the arms 22, 23, thereby positioning the core pin assembly 65 over the parison mold 55 as illustrated in FIG. 3 of the drawings. Next, the cylinder 25 is actuated to lower the parison pin 70, thereby inserting the parison pin into the parison mold bore 56. During this lowering operation, the cam surfaces 67 of the core pin block 66 contact the cam surfaces of the neck mold blocks 60, camming the neck mold blocks inwardly against the tension of the springs 62, so that the mold blocks 60 are assembled to define a complete finish mold cavity.

As the core pin 70 descends into the parison mold bore 56, the lower end 76 as the pin contacts the guide pin 48 and displaces the guide pin vertically against compression of the guide pin spring 52 while the sleeve valve 45 is held in its illustrated position of FIG. 3 by the sleeve valve cylinder 46. The core pin is guided vertically during the last increment of its lowering movement by the guide pin 48, and the core pin is centered in the cavity 56 by the engagement of the tapered surfaces 51 of the guide pin and 77 of the core pin.

After the core pin is seated and fully supported, the sleeve valve cylinder 46 is actuated to lower the sleeve valve, as illustrated in FIG. 4, thereby displacing the sleeve valve upper end below the level of the orifice 40. Consequently, plasticized material under pressure in the injection channel 36, 39, 40 flows into the parison mold cavity defined between the parison mold core pin 70 and the parison mold bore 56. As a result, a parison 80 is injection molded, this parison having an upper injection molded finish portion 81 confined between the cylindrical portion 72 of the core pin 70 and the finish defining surfaces 61 of the finish mold blocks 60. Parison 80 also includes a conical blowable sleeve portion 82 communicating at its lower end with plasticized material still in the orifice 38. This condition following the injection molding of the parison is illustrated in FIG. 4 of the drawings.

Next, the parison 80 is stripped from the parison mold 55. This is accomplished by elevating the core pin block 66 by means of the arm 22 and utilizing the sleeve valve 45 to shut off communication between the orifice 40 and the parison mold bore 56. This can be accomplished in either of two ways. If the parison mold is held assembled as illustrated in FIG. 4 while the sleeve valve 45 is elevated by means of the sleeve valve cylinder 46, additional material will be forced upwardly from the orifice into the mold cavity. This will serve to compact the parison by providing additional pressure known in the art as "after-pressure". In this event, the core pin block 66 is elevated only after the sleeve valve 45 is actuated to its closed position of FIG. 5. Alternatively, the block 66 may be elevated at the same time and at the same rate as the sleeve valve 45 is elevated to shut off the orifice 40. If these operations are carried out simultaneously, then the additional material displaced by the sleeve valve 45 attenuates the blowable sleeve portion 83 of the parison 80. The net results is an increase in the axial extent of the parison, if this is desired. Of course, no after-pressure will be applied to the parison if this operation is utilized.

Figure 6:
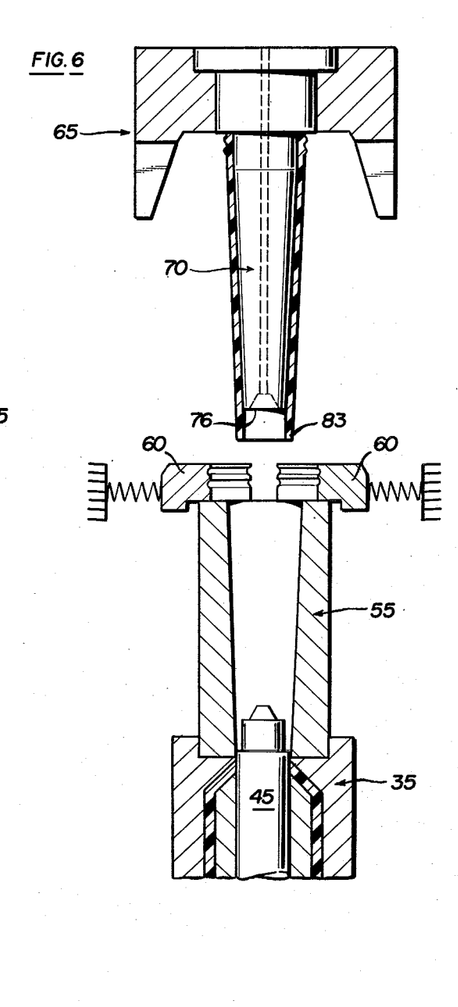
FIG. 6 is a view similar to FIG. 3 illustrating the stripping of the parison from the parison mold.

The taper of the parison mold cavity 56 and the corresponding taper of the parison core pin 71 assures ready stripping of the parison 80 from the parison mold. Further, the tension springs 62 open the finished mold blocks 60 as the parison is elevated to free the parison upon the tapered core pin 70, as illustrated in FIG. 6. It will be noted that the blowable sleeve portion of the parison 80 projects beyond the lower end 76 of the core pin, as indicated in FIG. 6 of the drawings by reference numeral 83, and the injection molded parison 80 is open at its lower end beyond the core pin.

Figure 7:
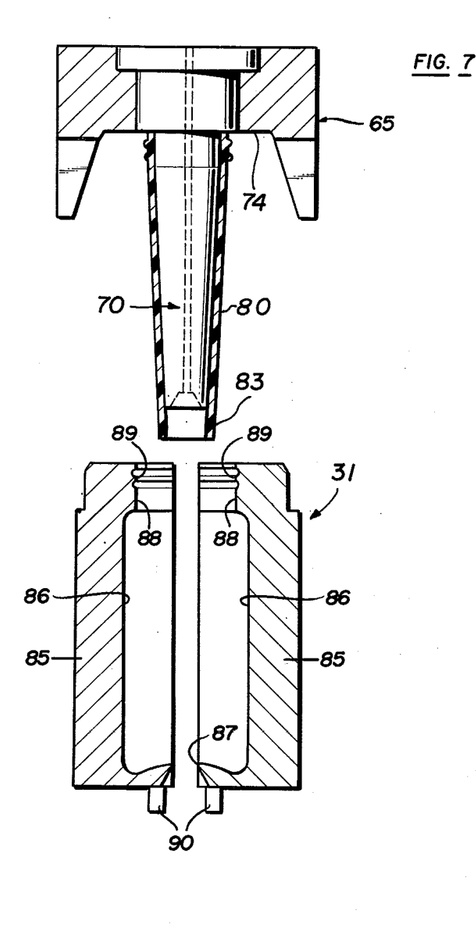
FIG. 7 is a view similar to FIG. 3 illustrating the assembly of the parison and core pin with pre-form blow mold.
Figure 8:
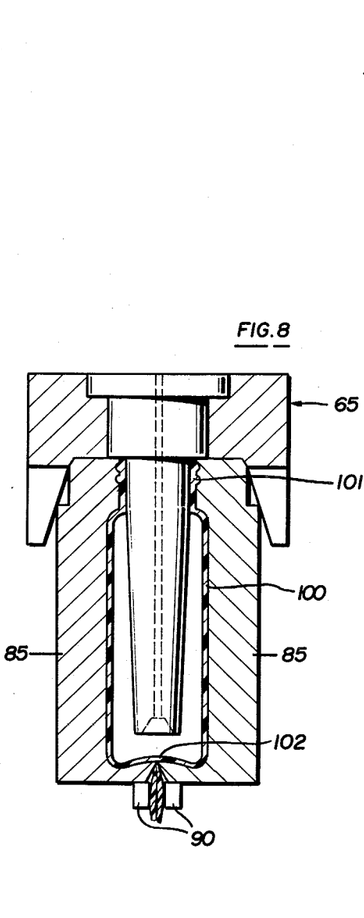
FIG. 8 is a view similar to FIG. 7 showing the elements assembled at the pre-form blow mold.

Next, the index cylinder 27 is actuated to retract the rack 26. The engagement of the rack 26 with the piston rod 24 will turn the arm 22 in a counter clockwise direction as illustrated in FIG. 1 of the drawings. Such actuation continues until the arm 22 vertically registers with the pre-form mold 31 at the station II. This condition is illustrated in FIG. 7 of the drawing. From the Figure, it will be seen that the pre-form blow mold 31 comprises a pair of openable pre-form blow mold sections indicated generally at 85, these sections being actuated to and from a closed position by means of the actuating cylinders 33 of FIG. 1. Each of the mold sections 85 defines a generally semi-cylindrical mold cavity having a lower pinching portion 87 and an upper semi-cylindrical opening 88 underlying upper finish mold blocks 89 which are identical to the mold blocks 60 heretofore described in connection with FIG. 3 of the drawings. The opening is provided at its upper region with a finish contour, as at 89, matching the contour of the finish formed in the finish blocks 60 of FIG. 3 of the drawings. The core pin assembly 70 next is lowered relative to the pre-blow mold 31 to insert the injection molded parison 80 into the cavity 86 defined by the two mold sections 85. When the under surface 74 of the core pin abuts the upper extremity of the mold 31, the mold sections 85 are closed to their position of FIG. 8. At this time, the pinching projections 87 engage the lower extremity 83 of the parison 80 to pinch the parison shut. Next, air under pressure is introduced through the core pin bore 75 to inflate the parison radially outwardly from the core pin and against the cavity-defining walls of the pre-form blow mold 31.

Figure 9:
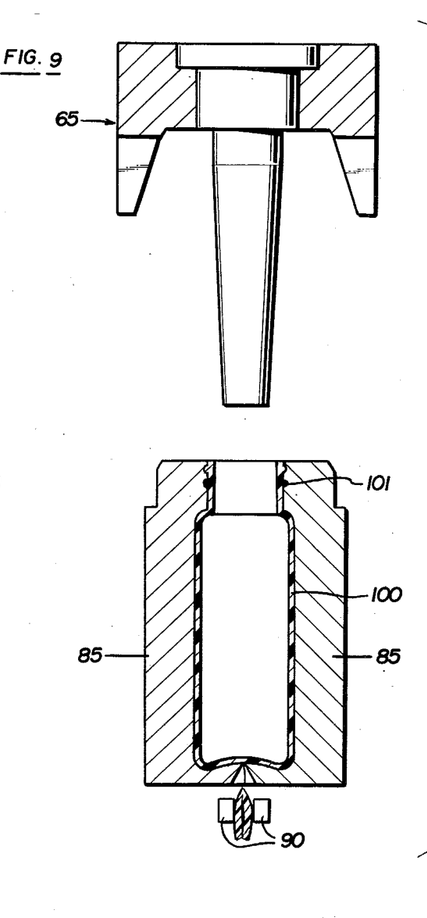
FIG. 9 is a view similar to FIG. 8 showing the stripping of the core pin from the blown pre-form.
Figure 10:
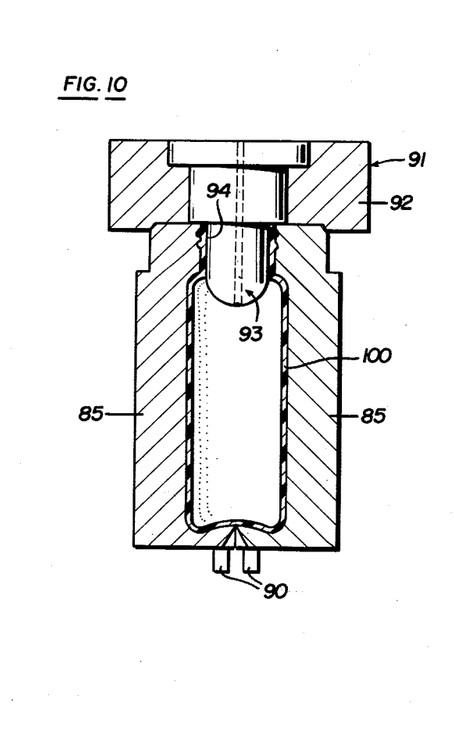
FIG. 10 is a view similar to FIG. 8 illustrating the insertion of a blow pipe into the blown pre-form.

After blowing is complete, the core pin assembly 70 is elevated, while the blow mold sections 85 remain closed as illustrated in FIG. 9 of the drawings. The blow preform 100 remains in the closed blow mold sections 85. Also, at this time, tail pulling elements 90 carried by the mold sections 85, respectively, are actuated downwardly to remove the tail which is been formed by the pinching shut of the parison portion 83 between the pinching portions 87 of the mold sections 85. Such tail pulling operations are well known in the prior art.

At this time, the index cylinder 27 of FIG. 1 is actuated to extend the rack 26 to the left, thereby swinging the support post 24 and the arms 22, 23 in a clockwise direction. This will reposition the arm 22 at the station I and the position the arm 23 at the station II, as illustrated in FIG. 1 of the drawings. The core pin assembly 70 carried by the arm 22 is again positioned as illustrated in FIG. 3, and the injection molding operations are again carried out at station I as heretofore described. The arm 23 is positioned to vertically align a blow pin assembly 91 with station II. This blow pin assembly 91 comprises a blow pin block 92 carrying a depending blow pin projection 93 which has an upper cylindrical portion 94 inserted into the finish portion 101 of the blown pre-form 100 which was earlier formed as described in connection with FIG. 8 and which is still retained within the closed pre-formed blow mold sections 85. The lower free end of the blow pin 93 is simply rounded to facilitate introduction of the blow pin into the blown pre-form when the arm 23 is lowered by the cylinder 25. Of course, as the arm 23 is lowred by the cylinder 25, the arm 22 is simultaneously lowered by the cylinder 25. While the arms 22 and 23 are lowered, the parison injection operations illustrated in FIG. 4 is carried out at station I.

The cylinders 31 at this station II are actuated to open the blow mold sections 85, releasing the blown pre-form 100. The cylinders 31 are operable independently of other portions of the apparatus, so the residence time of the blown preform 100 in the pre-form blow mold may be varied to correspondingly vary the cooling rate of the blown pre-form. After the parison injection operation at station I is completed, the cylinder 25 is actuated to elevate the blow pin block 91 and the blown pre-form 100 carried thereby, as illustrated in FIG. 11. Next, index cylinder 27 is actuated to retract the rack 26 and to swing the arm 23 counter clockwise into vertical registry with station III.

At station III is positioned a final blow mold 32 comprising a pair of openable and closeable blow mold sections 95 actuated by cylinders 33 between their open positions of FIG. 13 and their closed positions of FIG. 12. The blow mold sections 95 cooperatively define an interior blow mold cavity 96 corresponding to the shape of the final bottle to be formed and having integral finish portions 97 identical with the finish portions of the pre-form blow mold sections 85. The cavity 96 is somewhat larger than the cavity 86 of the pre-form blow mold 31 heretofore described. Of course, when the arm 23 is moved in registry with station III, the blow mold 32 is opened. Next, the cylinder 25 is actuated to lower the arm 23, the blow tube head 91 carried thereby and the blown pre-form 100 on the blow pin 93 downwardly between the blow mold sections. Next, the cylinders 33 are actuated to close the blow mold sections 32 and air under pressure is introduced through the blow tube to inflate the blown pre-form 100 to the shape of the final container 105.

Following the blowing operation and the necessary cooling, the arm 23 is elevated by actuation of the cylinder 25 while the blow mold sections 95 remain closed to strip the blow pipe vertically from the final blown container. The blow mold sections 95 are then opened to release the blown bottle from the cavity 96.

THE EMBODIMENTS OF FIGS. 14-19

Turning now to the embodiment of FIGS. 14-19, it will be seen that this version of the invention does not utilize the same injection molding technique as the embodiment of FIGS. 1-13. Rather, a parison is injection molded by "displacement molding" technique similar to that described in detail in my earlier U.S. Pat. No 3,590,114, assigned to Assignee of the present invention.

Figure 14:
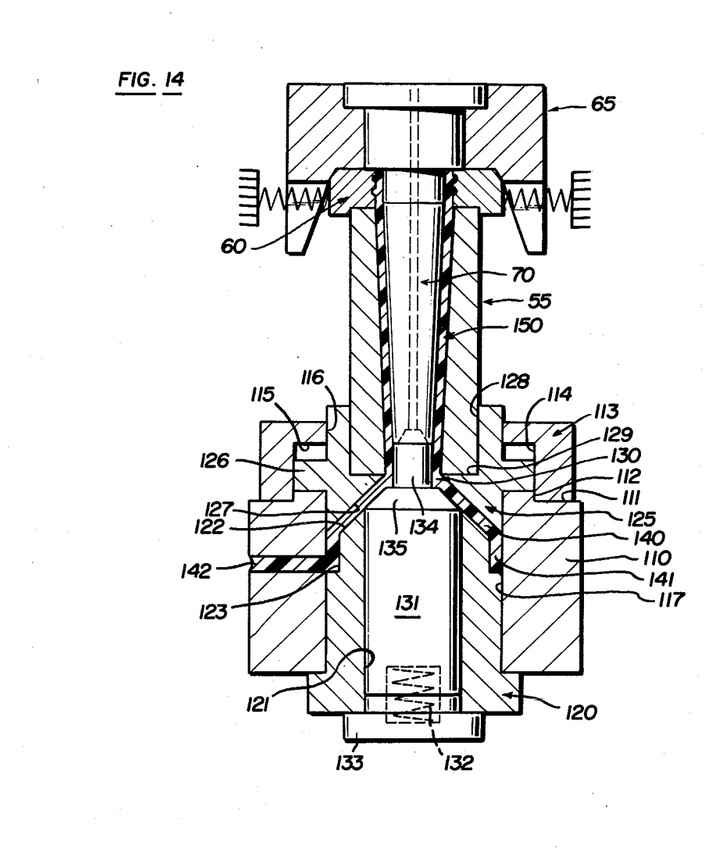
FIG. 14 is a view similar to FIG. 5 illustrating a different embodiment of the present invention wherein the parison is displacement molded.

More specifically, the embodiment of the invention of FIG. 14 includes an orifice block 110 having an upper outer shoulder 111 defining a central cylindrical embossement 112 upon which is seated a cap 113. This cap 113 has an interior recess 114 defining a radial stop shoulder 115 adjacent an upper bore 116. Projecting into the lower end of the orifice block 110 and located in the bore 117 thereof is a fixed plug 120. This plug, 120, has an axial bore 121 concentric with the plug. The upper surface of the plug is conical as at 122, and a reduced diameter embossment 123 joins the conical surface 122 to the main body of the plug 120.

Entrapped between the block 110 and the cap 113 is a moveable displacement element indicated generally at 125. This element 125 is generally cylindrical and has a peripheral shoulder 126 located in the recess 114 of the cap. Movement of the shoulder 126 in the recess 114 limits the vertical displacement of the displacement element 125, the shoulder abutting the upper surface of the orifice block 110 when the element is displaced downwardly, and the shoulder 126 abutting the undersurface 115 of the cap when the displaceable element is elevated. The element 125 has its bottom surface tapered to match the tapered or conical surface 122 of the plug 120. The free upper end of the element 125 is recessed at 128 to define a radial stop surface 129 which intersects the conical surface 127 to define an orifice indicated generally at 130.

Projecting axially of the plug 120 and located within the cylindrical bore 121 thereof is a valve 131. This valve 131 is free to move axially in the bore 121, the valve normally being urged upwardly from its position illustrated in FIG. 14 by compression spring 132 confined between the valve body 131 and a retainer cap 133 fixed to the plug 120. The valve body 131 has a chamfered, conical valving surface 135 surrounding a cylindrical extension 134 projecting upwardly and terminating in an upper conical guide surface, as earlier described in connection with the surface 51 of the guide pin 48 of the embodiment of FIGS. 1-13 conclusive.

The chamfered surface 135 on the valve body 131 is of the same inclination as (1) the conical surface 127 of the displacement member 125 and (2) the surface 122 of the plug. It will be appreciated that the valve body 131 seats against the displacement member surface 127 when it is urged upwardly by the spring 132, and the surface 1355 forms a continuation of the surface 122 of the plug 120 when the valve body 131 is displaced downwardly against the compression spring 132, as illustrated in FIG. 14. The space between the surfaces 122, 127 form a feed channel 140 opening onto the orifice 130, this channel communicting with an extruder or other source of plastic material under pressure by means of the passage 141 defined between the surface 123 the plug 120 and the block bore 117 and a radial passage 142 in the orifice block 110.

As illustrated in FIG. 14, the core pin assembly 65 of FIG. 14 is identical with the core pin assembly 65 heretofore described in connection with the embodiments of FIGS. 1-13. Identical reference numeral in FIGS. 14 and FIG. 3 identify identical portions of this core pin assembly. Additionally, in FIG. 14, reference numeral 55 refers to a fixed, generally cylindrical parison mold which is identical with the parison mold described in connection with FIG. 3 of the drawings. The parison mold 55 of FIG. 14 is provided with the same finish mold sections 60 heretofore described. All of the apparatus illustrated in FIG. 14 is located at station I of the machine essentially the same as that illustrated in FIGS. 1 and 2 of the drawings, and the core pin assembly 65 is carried by the arm 22 of the machine (not illustrated in FIG. 14).

The operation of the device of FIG. 14 is quite simple and straightforward. First the core pin assembly 65 is lowered to telescopically insert the axially elongated core pin 70 into the cylindrical parison mold 55, this parison mold being superimposed upon the displacement member 125 and firmly seated in the recess 128 to be bottomed against the shoulder 129. Initial telescopic motion of the core pin 70 into the mold 55 will contact the lower end of the core pin 70 with the projection 134 of the valve body 131. This centers and locates the core pin 70 interiorly of the parison mold cavity. Further displacement of the arm 22 and the core pin assembly 65 downwardly will depress the displacement member 125 downwardly within the cap 113. This movement also will displace the valve body 131 downwardly against the compression spring 132.

Donward displacement of the valve body 131 opens the passages 140 and the orifice 130 so that communication is established between the passage 140 and the composite parison mold cavity. Further, displacement of the displacement member 125 downwardly will force material from passage 140 upwardly into the parison mold cavity through the orifice 130, in the manner disclosed in my above identified U.S. Pat. No. 3,590,114, this material entering the parison cavity under pressure. As a result, plasticized plastic material will be displaced upwardly into the parison mold cavity and the parison will be formed.

After the parison cavity has been filled, the arm 22 and the core pin assembly 65 is elevated. This elevation of the core pin assembly will allow the spring 132 to raise the valve 131 to close the orifice 130 by interrupting communication between the passage 140 and the orifice 130. At the same time, the core pin 70 is being retracted from the parison mold 55 and no downward pressure is exerted by the core pin assembly on the displacement member 125. The plasticized material under pressure from the extruder or other source can now enter through the passages 142 and 141 to elevate the displacement member 125 upwardly, refilling the enlarged passages 140–141. This will elevate the displacement member 125 against the stop shoulder 115 of the cap 113.

As explained in connection with the earlier embodiment of the invention, the molded parison 150 has been formed by the plastic materials surrounding not only the core pin 70 but also the valve body projection 134. Since the valve body projection 134 remains at the orifice assembly, the parison 150 now depends beyond the lower end of the core pin 70.

Figure 15:
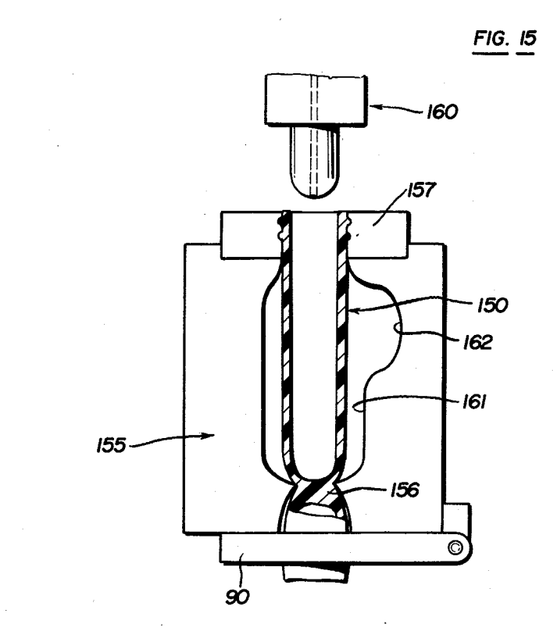
FIG. 15 is a view illustrating the parison of FIG. 15 positioned in a pre-form blow mold.

As a next step, the elevated parison mold assembly is moved counter clockwise to the preformed blowing station II, which is illustrated in FIG. 15 of the drawings. At this station, pre-form below mold sections 155 (only one of which is illustrated in FIG. 15) are closed onto the parison 150 as it is still supported on the core pin 70, the closure of the blow mold pinching shut the lower extremity of the parison 150 projecting beyond the core pin 70, as at 156. The blow mold sections 155 also carry finish mold blocks 157 which close upon the finish which was injection molded in the finished mold sections 60 during the performance of the step of the method illustrated in FIG. 14.

Following closure of the blow mold sections 155 onto the parison, the core pin 70 is extracted from the parison, leaving the parison at the preform station II. It will be noted from FIG. 15 that the blow mold sections 155 carry moveable tail removing elements 90, identical to those earlier described and well known in the art. The elements 90 may be actuated at any time that the blow mold sections 155 are closed to remove the pinched pill portion of the parison. As above explained, closure of the blow mold sections upon the parisn pinchs shut the parison to form a blowable shape. As illustrated in FIG. 15, a blow pipe, substantially identical to the blow pin assembly 91 earlier described and carried by arm 23, is inserted into the open upper end of the parison 150. It will be noted that the blow mold sections 155 cooperatively define a preform cavity 161 having a handledefining recess 162 therein.

Figure 16:
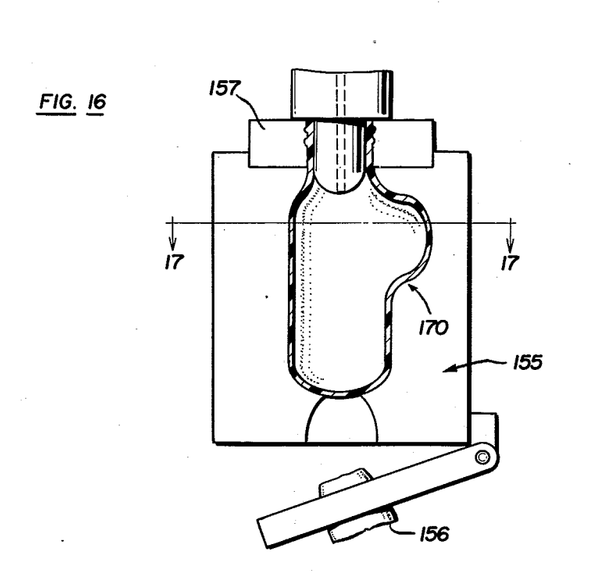
Figure 17:
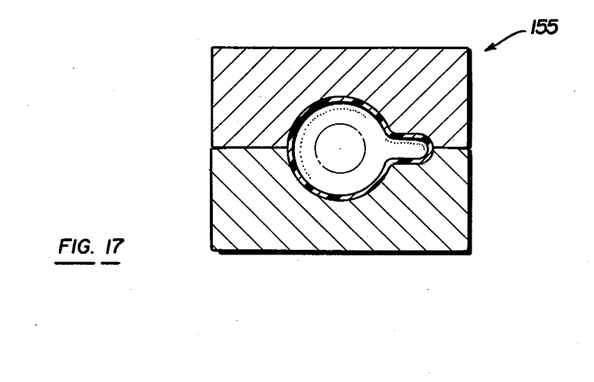
FIG. 17 is a sectional view taken along the plane 17—17 of FIG. 16.
Figure 18:
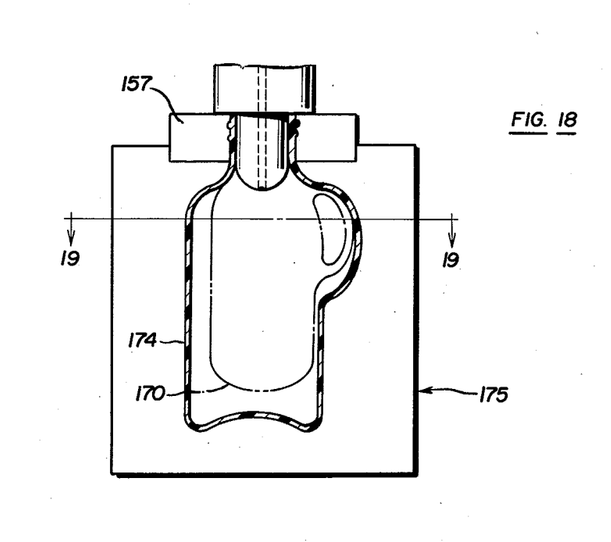
FIG. 18 is a view similar to FIG. 16 but showing the blowing of the pre-form into the final article in a final blow mold.
Figure 19:
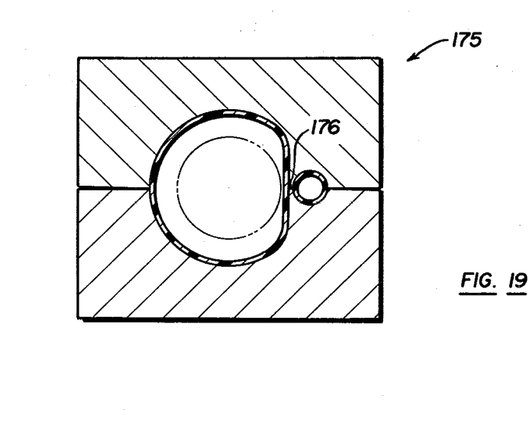
FIG. 19 is a sectional view taken along the plane 19—19 of FIG. 18.

The blow pin assembly 160 is inserted into the open upper end of the parison 150 and the parison is blown into the blow pre-form of 170, as illustrated in FIG. 16 of the drawing. This operation takes place at station II.

After the blown pre-form has been formed, the blow pre-form is transferred on the blow pipe 160 to station III, where the blown pre-form is blown to the final configuration of the described article 174. As illustrated the desired article is a handled container, and the extended blown end of the cavity portion 162 on the preform 170 is pinched shut in the final blow mold 175, as at 176 (FIG. 19), to form the desired container handle.

I claim:

1. In a method of making a blown plastic article, the steps of (1) downwardly displacing an elongated core pin for axially inserting the core pin into substantially the entire length of an elongated open ended parison mold cavity which is substantially the same length as the core pin but slightly longer, the core pin having a frusto-conical recess in its end, (2) as the core pin approaches the distal end of the mold cavity, abutting the cantilevered end of the core pin against the free end of an axially movable, essentially cylindrical, biased support which is concentric with the core pin and projects into the mold cavity, the support including a frusto-conical projection which is telescopically received within the core pin recess and centers the core pin in the mold cavity through engagement of tapered surfaces of the projection and recess, with said free end of the core pin and the cylindrical portion of the support being of substantially the same external diameter at their abutting ends, with the abutment of these members forming an essentially tubular cavity end portion having essentially the same inner diameter as the cavity portion immediately adjacent said end portion, and said support having an enlarged portion closing the adjacent end of the cavity, (3) jointly and axially displacing the core pin, the support, and the enlarged portion downwardly against the biasing force of the support (a) to guide the core pin during the final phases of the movement thereof into the mold cavity, (b) to remove the enlarged portion of the support from the cavity and (c) to expose the cavity to a source of plastic material in order to fill the cavity with plasticized plastic material under pressure introduced through an annular orifice surrounding the free end of said support to form an essentially tubular parison having an open end, (4) stripping the parison while supported on the pin from the mold cavity by vertically raising the core pin, with a minor terminal tubular portion of the parison projecting beyond the core pin, said terminal tubular portion having a thickness substantially the same as that portion of the parison adjacent the cantilevered end of the core pin, (5) displacing the parison on the core pin along an arcuate path to a blow molding station, (6) vertically lowering the core pin and parison to a position between a pair of blow mold sections (7) closing the mold sections and thereby pinching shut the projecting end of the parison, (8) blow molding the parison at said blow molding station to form a blown article, (9) stripping the blown article from the blow pin by vertically raising the blow pin relative to the blown article, and (10) displacing the blow pin along an arcuate path back to a position in vertical alignment with the parison mold.

2. A method of making a blown plastic article, the steps of axially inserting an elongated cantilevered core pin into substantially the entire length of an elongated open-ended parison mold cavity that is selectively placed in communication with a source of thermoplastic material under pressure by an axially reciprocal sleeve, the core pin having a frustoconical recess in its free cantilevered end, as the cantilevered end of the core pin approaches the distal end of the mold cavity abutting the core pin with an axially movable, biased support concentric with the core pin, said support having a frusto-conical projection of reduced diameter which telescopically seats with the correspondingly shaped recess in the cantilevered end of the core pin and centers the core pin in the mold cavity through engagement of tapered surfaces of the projection and recess and an essentially portion of the same diameter as the free end of the core pin, jointly displacing the core pin and the support in the direction of the support and against the biasing force on the support (1) while the frusto-conical projection stabilizes the pin in the cavity, and (2) the cylindrical portion forms a continuation of the pin to define a cavity end portion of essentially constant thickness, displacing the sleeve from the cavity to form an uninterrupted annular opening adjacent the support to accomodate communication between said source of thermoplastic material and said cavity to fill the cavity with plasticized plastic material under pressure, the introduction of plastic material into the cavity forming an essentially tubular parison with an end portion in the region of the movable support having the same wall thickness as the parison portion adjacent the cantilever end of the core pin, displacing the sleeve back into the cavity to discontinue communication between said source of thermoplastic material and the cavity, stripping the parison with the pin from the mold cavity, a portion of the parison projecting beyond the core pin, transferring the parison to a blow molding station, pinching shut the projecting end of the parison with a pair of blow mold sections as the sections are closed on the parison to form a blow mold cavity, and blow molding the parison internally of the blow mold cavity to form a blown plastic article.

3. The method as defined in claim 2, wherein the sleeve is displaced back into the cavity simultaneously with axial retraction of the core pin upon stripping the parison from the mold.

4. The method as defined in claim 2, wherein the sleeve is displaced back onto the cavity prior to any axial retraction of the core pin, in order to compact the parison material in the mold cavity.

5. The method as defined in claim 2, characterized by downwardly displacing the core pin to axially insert the core pin in the mold cavity, upwardly displacing the core pin to strip the parison from the cavity, displacing the core pin along an arcuate path while tranferring the parison to the blow molding station, and downwardly displacing the core pin and parison to a position between the blow mold sections prior to closing the mold sections.

6. The method as defined in claim 5, further including the steps of upwardly displacing the core pin from the blow mold sections after blow molding, retaining the blown container within the mold sections, and displacing the core pin along an arcuate path back to a position in vertical alignment with th parison mold cavity.

7. The method as defined in Claim 1, characterized, prior to the performance of Step 9, by transferring the blown article from said blown molding station to a second blow mold, and inflating the blown article in the second blow mold to form a final blow article.

8. The method as defined in Claim 2, characterized by transferring the blown plastic article from said blow molding station to a second blow mold, and inflating the blown article in the second blow mold to form a final blown article.

* * * * *

UNITED STATES PATENT AND TRADEMARK OFFICE
CERTIFICATE OF CORRECTION

PATENT NO. : 4,057,609

DATED : November 8, 1977

INVENTOR(S) : Albert R. Uhlig

It is certified that error appears in the above-identified patent and that said Letters Patent are hereby corrected as shown below:

Column 1, line 28, "encases" should be --encased--.
Column 1, line 64, "elements" should be --element--.
Column 4, line 9, "communictes" should be --communicates--.
Column 4, line 64, after "surfaces", insert --67--.
Column 5, line 25, after "surfaces", insert --68--.
Column 6, line 34, after "cavity", insert --86--.
Column 7, line 16, "lowred" should be --lowered--.
Column 8, line 47, "1355" should be --135--.
Column 8, line 52, "communicting" should be --communicating--.
Column 9, line 21, "Donward" should be --Downward--.
Column 9, line 22, "communic-" should be --communica---.
Column 10, line 10, "parisn" should be --parison--.
Column 11, line 26, "with" should be --within--.
Column 11, line 30, after "essentially", insert --cylindrical--
Column 12, line 34, "th" should be --the--.

Signed and Sealed this

Twenty-first Day of March 1978

[SEAL]

Attest:

RUTH C. MASON
*Attesting Officer*

LUTRELLE F. PARKER
*Acting Commissioner of Patents and Trademarks*